United States Patent [19]

Tacchi

[11] 4,241,784

[45] Dec. 30, 1980

[54] ARRANGEMENTS FOR THE TRANSFER OF HEAT FROM AN UPPER LEVEL TO A LOWER LEVEL

[76] Inventor: Victorio Tacchi, 50 Rioja St., Cordoba, Argentina

[21] Appl. No.: 935,848

[22] Filed: Aug. 22, 1978

[30] Foreign Application Priority Data

Aug. 23, 1977 [AR] Argentina .............................. 268907
Jul. 18, 1978 [AR] Argentina .............................. 272998

[51] Int. Cl.³ ............................................. F28D 15/00
[52] U.S. Cl. ..................................... 165/105; 237/67; 126/433
[58] Field of Search ......................... 165/105; 237/67; 62/333

[56] References Cited

U.S. PATENT DOCUMENTS 4,061,131 12/1977 Bohanon .............................. 165/105

*Primary Examiner*—Albert W. Davis
*Attorney, Agent, or Firm*—Fleit & Jacobson

[57] ABSTRACT

An arrangement for transferring heat from an upper level to a lower level by causing a liquid to be heated and evaporated in a first chamber at the upper level thus causing an increase in pressure in the chamber which obliges the fluid to flow, through a heat exchanger positioned at the second level and whereat the liquid liberates heat, back into a second chamber positioned above the first chamber and in communication therewith through a valve which is normally closed but is opened in response to certain pressure differences between said first and second chambers so as to intermittently permit the return of liquid from said second chamber to said first chamber. The pressure cycles generated in the first chamber and the flow of liquid can be used to drive mechanical means.

5 Claims, 4 Drawing Figures

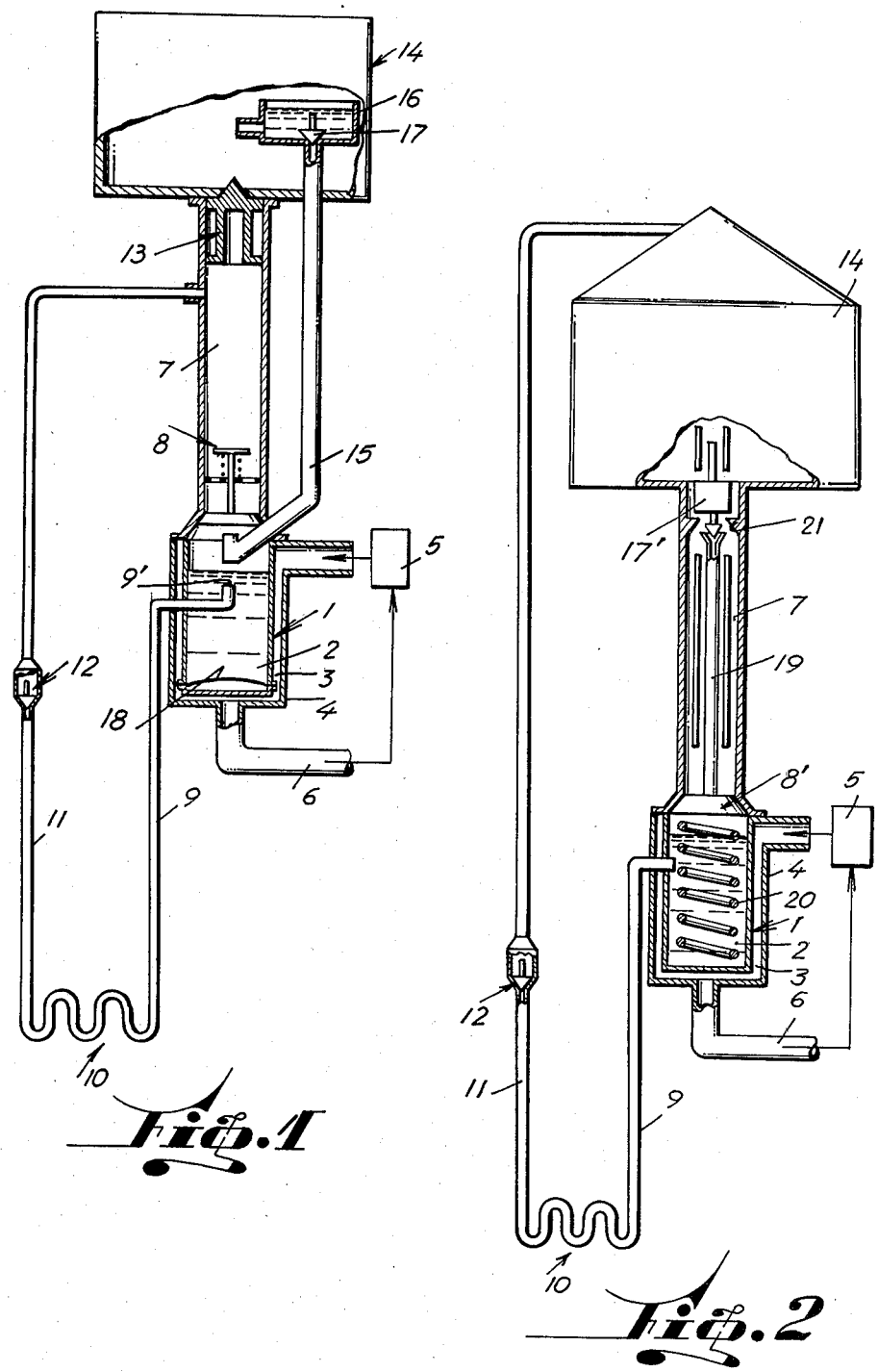

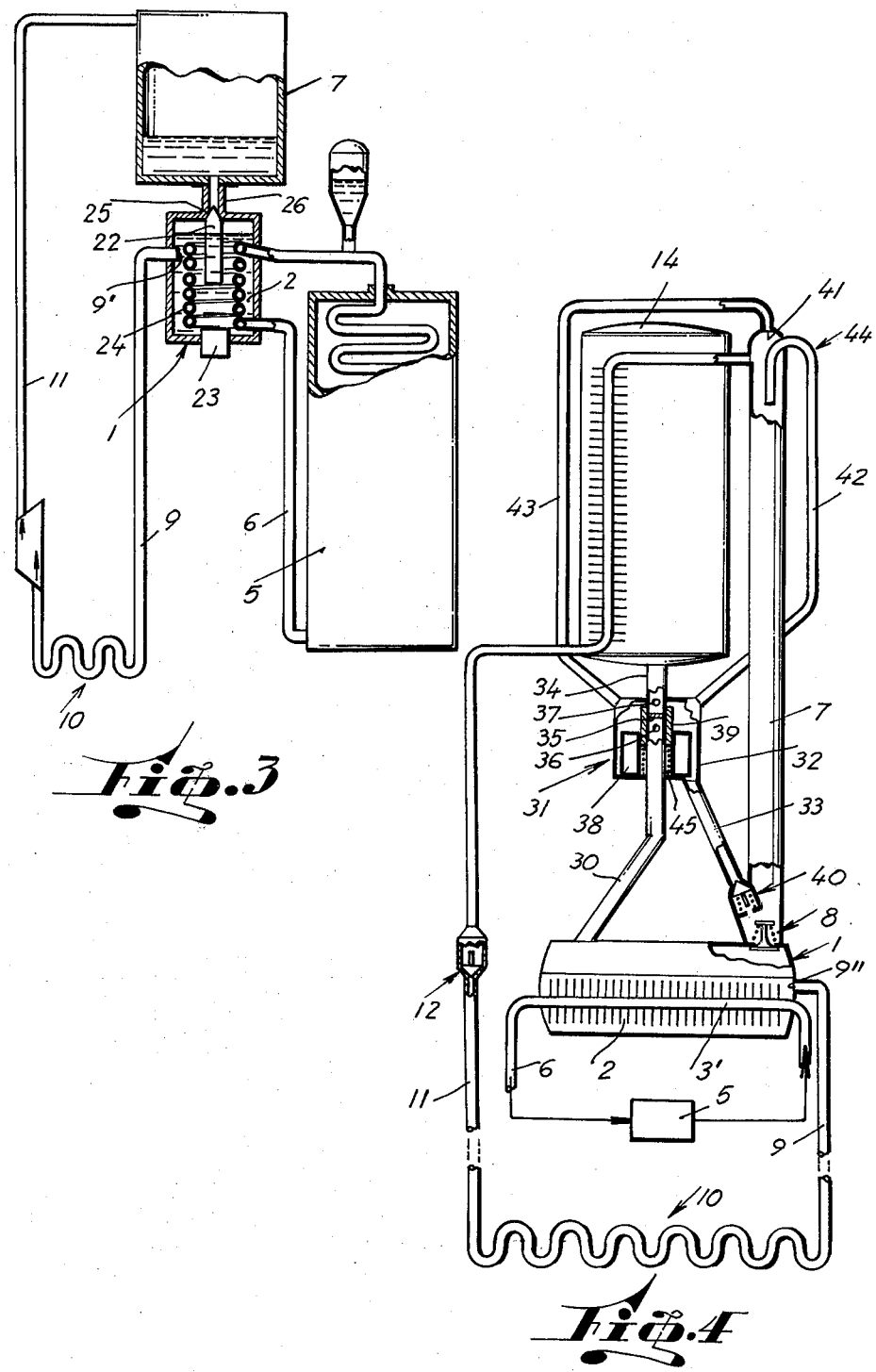

ARRANGEMENTS FOR THE TRANSFER OF HEAT FROM AN UPPER LEVEL TO A LOWER LEVEL

BACKGROUND OF THE INVENTION

1. Field of the Invention

The present invention relates in general to the conversion or transfer of energy and more particularly to the conversion or transfer of heat.

Even more particularly, the invention relates to an arrangement wherein pressure cycles are created in a chamber containing a liquid, by heating the liquid and causing evaporation thereof, such pressure cycles being used as a driving force for the liquid or for a mechanical device. Still more particularly the invention relates to an arrangement for the transfer of heat from an upper level to a lower level by means of the pressure generated by evaporation of the liquid at the upper level.

2. Description of the Prior Art

In my U.S. patent application 708,071 filed on July 23, 1976 I described a system for taking advantage of the inertia of a fluid which has been heated in a solar energy collector and caused to flow to a place of use only by the energy it has acquired from the collector. The inertia due to the flow of the fluid causes a negative pressure down current of the flow thus inducing the ingress of fresh cool fluid into the system where it is heated and again caused to flow to the place of use. This system is adequate and practical; however, for transferring larger amounts of heat between very spaced apart locations positioned at notably different levels I have found that another simpler system is possible and even preferable and which does not rely on the inertia of the flow of fluid for its operation. In this new simpler system the speed of flow of the fluid is less smaller than in the system described in my above mentioned patent application and therefore losses due to friction are reduced.

By providing various systems, based on different principles of operation, industry will be in a better position to select the most adequate for a certain purpose.

The arrangement of the present invention is particularly but not exclusively suited for use in combination with a solar energy collecting panel which is generally placed on the roof of a building, for transferring the collected energy from the panel to a lower level within the building.

SUMMARY OF THE INVENTION

Broadly speaking the invention resides in an arrangement for creating a pressure cycle in a chamber, the arrangement comprising a first chamber for housing an easily vaporizable liquid to be heated, a second chamber above said first chamber; a first communication between said second chamber and said first chamber; a second communication between said first chamber and said second chamber; means for heating the liquid when in said first chamber and causing an increase in pressure within said first chamber to make the fluid flow to said second chamber through said second communication; a valve in said first communication for preventing the flow of liquid from said first chamber to said second chamber and for only intermittently permitting the liquid to flow from said second chamber back to said first chamber, and means for cooling the fluid after it has left the first chamber, and before it returns thereto through said valve.

More particularly, the invention resides in a closed circuit arrangement for transferring heat from a first upper level to a second lower level by heating a liquid at the first level and causing it to flow through the second level, whereat the heat is extracted therefrom, back to the first level, the arrangement comprising a first chamber for housing an easily vaporizable liquid and defining said first upper level; a second chamber above said first chamber; means defining a communication for fluid flow from said first chamber to said second chamber and having a part thereof extending through said second lower level; means for heating and vaporizing the liquid when in said first chamber to cause the liquid or its vapor to flow through said lower level into said second chamber by effect of an increase in pressure in said first chamber; means enabling said liquid to liberate heat at said second lower level; means defining a return path for liquid from said second chamber to said first chamber; and valve means interposed in said means defining the return path and adapted to intermittently permit the return of liquid from said second chamber to said first chamber.

BRIEF DESCRIPTION OF THE DRAWINGS

FIG. 1 is a schematic representation, partially in cross section, of an arrangement for transferring heat from a first upper level to a second lower level by heating a liquid at the first level and causing it to flow, through the second level whereat the heat is extracted therefrom, back to the first level, and which incorporates the teachings of the present invention.

FIG. 2 is a schematic representation partially in cross-section of an alternative embodiment of the arrangement of FIG. 1.

FIG. 3 is also a schematic representation partially in cross-section but of a further alternative embodiment of the arrangement of FIG. 1.

FIG. 4 is a schematic representation partially in cross-section but of an even further alternative embodiment of the arrangement of FIG. 1.

DESCRIPTION OF THE PREFERRED EMBODIMENTS

Reference will now be made, in detail, to the embodiments shown in FIG. 1.

The closed circuit arrangement shown in this figure comprises a first normally closed chamber 1 partially filled with an easily vaporizable liquid 2. This chamber 1 is positioned at a first level for example on the roof of a building (not shown).

The liquid 2 within chamber 1 is in good heat transfer relationship with a fluid adapted to flow within space 3 surrounding chamber 1. This space 3 is defined around chamber 1 by a wall 4 and is in communication with a source of heat such as a solar energy collecting panel schematically represented at 5.

The fluid, for example water, which flows in space 3 is heated by the solar energy collector 5 and returns thereto by means of conduit 6.

A second chamber 7 is positioned above chamber 1 and is in direct communication therewith when automatic unidirectional valve means 8 is in an open position. Valve means 8 are spring loaded so as to be normally closed.

A conduit 9 communicates the lower portion of chamber 1 with the inlet of a heat exchanger 10 positioned at a second level which is lower than the first level defined by chamber 1. The mouth 9' of conduit 9 is positioned so as to be permanently within the body of liquid 2. The outer of heat exchanger 10 is communicated by a conduit 11 with chamber 7. A one way valve 12 is interposed in this conduit 11 to permit liquid flow from chamber 1 to chamber 7 but to prevent flow in the opposite direction. A floating valve 13 is mounted within chamber 7 to obstruct communication (when chamber 7 is full of liquid) between chamber 7 and an auxiliary condensing chamber 14 positioned above chamber 7 and in communication therewith.

The upper portion of chamber 1 (where there is vapor but no liquid) is communicated with chamber 14 by a conduit 15 for vapor which extends into a reservoir 16 positioned within chamber 14. A differential valve 17 is positioned at the outlet of conduit 15 into reservoir 16 and can only be opened when the pressure within conduit 15 is much greater than the pressure acting thereon from reservoir 16 and chamber 14 (this is achieved, as will be seen later on, once chamber 7 has become full of liquid).

Reservoir 16 is in open communication with chamber 14.

If desired, differential valve 17 may be replaced by a slide valve.

Additionally, conduit 11 can be made to extend through chamber 14 so that the liquid flowing along conduit 11 extracts heat from chamber 14 thus causing condensation of the vapor ingressing into chamber 14 from chamber 1 through conduit 15.

Chamber 14 is of a volume about ten times that of chamber 7, although this may vary as long as the volume of chamber 14 is sufficient to avoid a considerable increase of pressure therein when valve 17 is opened. The volume of chamber 7 is the pumping volume of the arrangement.

OPERATION

In operation, the solar energy collector 5 will heat the fluid in space 3 and this heat will be transferred to the liquid 2 contained in chamber 1. Heating of this fluid 2 will cause it to boil and the evaporation thereof will increase the pressure within chamber 1 which is momentarily closed by valves 8 and 17. This increase in pressure in chamber 1 will cause liquid 2 to flow along conduit 9 through heat exchanger 10 whereat the liquid can liberate heat for any useful purpose. The cooled down liquid will be forced to flow up conduit 11 by the hot fluid leaving chamber 1, and begin to accumulate within chamber 7. While this occurs, vapor flows from chamber 7 into chamber 14. When chamber 7 has become full, floating valve 13 closes communication between chamber 7 and chamber 14. The heat fed into liquid 2 will cause the pressure within chamber 1 to rise until it is sufficient to open differential valve 17 which is kept closed either for example by gravity, a spring or a magnet. When this happens, the pressure within chamber 1 will suddenly drop and the pressures in chambers 1 and 14 will tend to become equal and consequently, valve 8 will open by effect of the weight of the liquid within chamber 7 (the vapor pressure in chamber 1 is lower than the liquid and vapor pressure in chamber 7) permitting the liquid accumulated in chamber 7 to return to chamber 1.

As the level of liquid within chamber 7 falls, valve 13 will open and the condensate accumulated within chamber 14 will return to chamber 7.

The cooler liquid entering chamber 1 is at a temperature which is below the boiling temperature of the liquid in chamber 1. This boiling temperature is determined by the pressure therein. The liquid in chamber 1 due to its thermal contact with the fluid in chamber 3 will again be heated thus initiating another cycle.

It is convenient that the connection between chambers 1 and 7 be effected with adequate materials to reduce or prevent the passage or transfer of heat therebetween, thereby increasing the efficiency of each cycle of operation of the arrangement.

The pumping arrangement so far described is self-adjusting inasmuch as that upon heat exchanger 10 reaching a temperature equal to the boiling temperature of the liquid 2, the liquid 2 will boil thereby increasing the pressure in chamber 14. Consequently, valve 17 will not open until a pressure has been reached within chamber 1 which is higher than the pressure at which valve 17 opens when no boiling of the liquid 2 occurs outside chamber 1. This higher pressure in chamber 1 causes liquid 2 therein to boil at a higher temperature. As long as there is sufficient temperature difference between the fluid flowing from collector 5 to space 3 and the fluid 2 in chamber 1, for the former to transfer heat to the latter, the arrangement will continue to operate at temperatures which are a direct consequence of the variations in pressure therein.

The fluid to be used in the arrangement described depends basically on the final temperature desired to be transferred from heat exchanger 10. For example, if the arrangement of the present invention is to be used to heat the water of a swimming-pool, heat exchanger 10 will be submerged in the water of the swimming-pool while solar energy collector 5 will be in any adequate position for receiving solar energy. In general, collector 5 will be at a level above the level of heat exchanger 10. For heating the water of the swimming-pool, it is advisable to use a liquid with a boiling temperature of about 23° C. (trichloro mono fluor methane, $CCl_3F$) which will permit initiation of the transfer of heat from heat exchanger 10 to the water of the swimming-pool when the temperature of the fluid leaving collector 5 and flowing through space 3 is at about 32° C. If the temperature of operation of the arrangement is to be about 50° C., the same fluid can be used, although the system will be submitted to pressures of about 2 $Kg/cm^2$ while if the maximum temperature of operation is to oscillate about 90° C., by using $CCl_3F_1$ the pressure will rise to about 6 $kg/cm^2$. In order to avoid these high pressures, it is possible to use a liquid having a higher boiling point such as for example methylene chloride or an alcohol whereby the transfer of heat will commence at temperatures about 42° C. and 78° C., respectively, in chamber 1.

If desired, an initial underpressure below that of atmosphere can be created within the arrangement so as to provide for lower boiling points of the fluid and consequently lower pressures.

Chamber 14 serves also as a condensation chamber for the vapor leaving chamber 1 and flowing through conduit 15 and valve 17. By condensing this vapor in chamber 14 it will return to the circuit in liquid form. The heat given off by the condensation of the vapor in chamber 14 is transported in part by the condensate itself while part is transferred to the liquid in chamber 7 by thermal conductivity; another part of this heat can be absorbed by the liquid flowing along conduit 11 when the latter is made to extend through chamber 14 before entering into chamber 7.

The efficiency of this arrangement is similar to that of a system operating on the principle of a thermo-siphon. With regard to a normal pumping arrangement energized by an electric motor or a gasoline engine, the advantages of the arrangement described are clearly noticeable inasmuch as that it does not require any power source other than the same source of heat used for heating the fluid and in addition, no thermo contacts, thermo regulators, pumps nor motors are needed.

Valve 12 serves basically to prevent the return of liquid to chamber 1 due to the difference in level of the liquids in chambers 7 and 1 when both chambers are in communication through valve 5. However, when the volume of conduit 11 is relatively small with regard to the volume of chamber 7, valve 12 can be omitted.

If desired, valve 12 can be loaded so as to avoid the passage of liquid upwards through conduit 11 until a predetermined pressure has been reached within chamber 1. For certain applications, it is advisable that the pressure within chamber 1 reach a certain value before liquid is caused to flow from chamber 1 to chamber 7. This is particularly the case when, for example, a turbine is incorporated within the flow of liquid along conduit 9 because in this way it is assured that the flow pressure acting on the turbine is sufficient to drive it.

Valve 12 instead of being spring loaded could be of the sliding type operated by a floating arrangement which responds to differences in level in the liquid.

Floating valve 13 can also be eliminated by dimensioning chamber 7 so that it is of reduced horizontal cross section but of sufficient height to provide pressures within chamber 1, once chamber 7 is full, which are sufficient to open differential valve 17.

Likewise, other means can be used, in place of valve 17, to discharge the vapor from chamber 1 to chamber 14 once chamber 7 has become full. For example, it is possible to use floats positioned in chamber 1 and which upon a predetermined low level being reached therein, they permit the egress of pressure towards chamber 14. A further alternative is to provide an inertia valve in place of differential valve 17 and which, once opened, delays in closing thereby permitting chamber 1 to receive all the fluid from chamber 7.

If desired, solar energy collector 5 and chamber 1 can be an integral unit.

It has briefly been stated that a turbine can be incorporated into the flow of liquid along conduit 9. Alternatively, a piston motor can also be incorporated therein so as to take advantage of the flow energy of the fluid pumped from chamber 1 into chamber 7.

It will be seen from the foregoing that during operation, pressure cycles are created within chamber 1. The amplitude of these cycles is defined by the maximum pressures produced in chamber 1 which occurs when valve 17 is opened and by the minimum pressure created in chamber 1 which occurs when valve 8 is opened. The frequency of these cycles depends on the dimensioning of the components, the loading of the valves and the rate of transfer of heat to chamber 1 and from heat exchanger 10. These cycles of pressure can also be taken advantage of, for example, by including a diaphragm 18 within chamber 1 and which is responsive to the pressures within this chamber. Movement of this diaphragm can be used to drive an external means. Obviously, this diaphragm could be replaced for example by a piston connected to external means for receiving movement from the piston when the latter is driven by the pressure cycles created within chamber 1.

Reference will now be made to FIG. 2. In this drawing the same reference numbers have been used as in FIG. 1 so that the parallelism between both embodiments is clear. Only those essential features of structure and operation of the embodiment of FIG. 2 which are different to those of FIG. 1 will be referred to in detail. Unless expressly indicated the alternatives of one embodiment are feasible for all the other embodiments.

In the embodiment of FIG. 2, conduit 11 extends from heat exchanger 10 into auxiliary chamber 14. Valves 8, 13 and 17 of FIG. 1 have been replaced by a combination of valves which comprises a valve 8' biased to a closed position by spring 20 and similar to valve 8 of FIG. 1 but which incorporates a hollow guided stem 19 extending upwardly through chamber 7. The upper end of hollow stem 19 defines a seat for a floating valve 17'.

In operation, the liquid 2 contained in chamber 1 boils and is vaporized due to the heat transferred thereto from the fluid flowing in space 3. The increase in pressure within chamber 1 (valves 8' and 17' are normally closed) causes the liquid 2 to flow through heat exchanger 10 up into auxiliary chamber 14. The heat contained in the liquid flowing through heat exchanger 10 is extracted therefrom for use.

Valve 8' remains closed due to the combined effect of spring 20 and the pressure of vapor within chamber 1. Hollow stem 19 of valve 8' permits the passage of vapor pressure from chamber 1 to valve 17' which will remain closed due to the effect of the weight of the body of valve 17'. The relative weight of valve 17' is lower than that of the liquid contained in chamber 7 so that it will float when immersed in this liquid.

The liquid flowing through conduit 11 reaches auxiliary chamber 14 and flows into chamber 7 by gravity. When chamber 7 is full, the floatable body of valve 17' causes valve 17' to open. Consequently, the pressure within chamber 1 will decrease and the pressures in chambers 7 and 14 will become equal to that of chamber 1; valve 8' which sustains the column of liquid within chamber 7 will open due to the weight of the column of liquid, thereby permitting the flow of liquid from chamber 7 to chamber 1. Valve 17' which normally closes the upper end of hollow stem 19 is prevented by an abutment 21 from falling with valve 8' whereby valve 17' will remain open during a part of the time during which valve 8' is open.

When chamber 7 is nearly totally empty of liquid, spring 20 will cause valve 8' to become closed. Just before valve 8' and hollow stem 19 reach the end of their upward or closing movement, the top end of hollow stem 19 will establish contact with valve 17' and thus become closed, whereby, chamber 1 will again become closed and a new cycle of operation will be initiated as long as heat is transferred to the liquid within chamber 1.

The total weight of valve 17 ' is such that the maximum pressure within chamber 1, and which is necessary to cause the liquid to flow along conduit 9 and conduit 11, is not sufficient to open it. Valve 17' will become opened only by floatation in liquid 2. Spring 20 must be dimensioned to amply sustain the combined weight of valves 8' and 17'.

Reference will now be made to FIG. 3 which shows a simple embodiment similar to those already described but wherein the valve means is a float valve 22 positioned within chamber 1 and which, upon a predetermined rising level of liquid being reached within chamber 1, closes the mouth 25 of chamber 1 which directly communicates with the bottom of chamber 7 by a conduit 26 which defines a return path for the liquid from chamber 7 to chamber 1. The bottom portion of float valve 22 is of paramagnetic material and the bottom of chamber 1 incorporates a magnet member 23 adapted to retain float valve 22 in an open position when the latter falls and opens due to a decrease in the level of liquid within chamber 1.

In this embodiment, heat exchange between the hot fluid flowing from solar energy collector 5 and the colder liquid 2 is effected by a heat exchanger 24.

During operation and due to the increase in pressure within chamber 1 also caused by evaporation of liquid 2, the liquid will flow through conduit 9, heat exchanger 10 and conduit 11 into chamber 7, thereby causing a decrease in the level of liquid within chamber 1 up to a point at which float valve 22 will open. Due to magnet 23, valve 22 will be held open thereby permitting the liquid accumulated in chamber 7 to fall into chamber 1 while the vapor pressures in chambers 1 and 7 are equalized. Until equalization, the greater vapor pressure in chamber 1 will cause the vapor to bubble through the falling liquid. It is to be noted that the rising vapors will become condensed when they bubble through the colder falling liquid.

The purpose of permanent magnet 23 is to delay floatation of valve 22 until substantially all the liquid in chamber 7 passes into chamber 1 at which time valve 22 will close mouth 25 and a new cycle of operation will be initiated.

In this embodiment, as well as in the others a turbine or other means can be incorporated into the flow of liquid from chamber 1 to chamber 7 so as to take advantage of the energy of this flow. Likewise chamber 1 of FIG. 3 can incorporate a diaphragm similar to that shown at 18 in FIG. 1 and for the same or similar purpose. The same applies to the embodiment of FIG. 2.

Reference will now be made to the embodiment of FIG. 4 by means of which it is possible to achieve larger efficiency because this arrangement transfers a substantially larger amount of heat (up to 6 or 7 times more) than the heat transferred by the arrangements shown in FIGS. 1 to 3 with similarly dimensioned components. Likewise, it is possible to obtain higher differences in pressure, thus creating more useful energy at a lower cost.

The foregoing is obtained basically due to the incorporation of valves for equalizing pressures and thus obtaining the return of cold fluid independently of the higher pressures of use and without the operation of these valves being influenced by these pressures. The foregoing is also obtained by the use of a particular circuit for the flow of fluid and which excludes chamber 14, during the phase within which the pressures in chambers 1 and 7 tend to become equal, by causing the vapor to flow directly into chamber 7.

By excluding chamber 14 (FIGS. 1 and 2) the amount of vapor which is necessary to obtain equal pressures in the vaporization chamber 1 and in the chamber for accumulating cold fluid 7, will be lower (up to 9 times) when chamber 14 has a volume ten times larger than the volume of fluid caused to flow during each cycle. The consequence of the foregoing is that less heat is lost by the condensation of vapor in the upper portions of the system, thereby increasing efficiency. Additionally, with the arrangement of FIG. 4, it is possible to rely on the latent heat of the vapors, for transferring heat. By causing vapor to flow instead of liquid, from the first upper level to the second lower level, the vapors can be condensed at the lower level thereby given off larger amounts of heat with a lower temperature difference.

In FIG. 4, the same reference numbers as in FIG. 1 have been used to identify like or similar components.

In the embodiments of FIG. 4, space 3 shown in FIGS. 1 and 2 has been replaced by a heat exchanger 3' which is in good heat transfer relationship with the liquid 2 in chamber 1. The hot fluid from solar energy collector 5 flows through heat exchanger 3' for transferring heat to liquid 2.

As will be seen more in detain further on, the mouth 9" of conduit 9 can be positioned so as to be permanently within the body of liquid 2 or else in a higher position so as to permit the flow of vapor therethrough into heat exchanger 10.

The upper part of chamber 1 is in communication by means of a conduit 30 with a valve arrangement 31 comprising a valve control chamber 32. The lower portion of valve control chamber 32 is in communication with chamber 7 by means of conduit 33 provided with a one way valve 40 therein. Chamber 32 is also in communication with chamber 14 by means of a further conduit 34 which is not in communication with conduit 30. This lack of communication is established by placing an obstruction 35 between perforations 36 and 37 formed in conduit 30 and conduit 34 in the portions extending inside chamber 32. A floating valve 38 is positioned within chamber 32 and comprises an obstructing member 39 adapted to obstruct perforation 36 when valve 38 is in its lowermost position and to obstruct perforation 37 when valve 38 is in its uppermost position whereby obstruction of perforations 36 and 37 is a consequence of the absence or presence of liquid within chamber 32.

The upper portion of chamber 32 is in communication with the upper end of chamber 7 by means of a further conduit 43.

A siphon arrangement 44 is provided between the upper end of chamber 7 and the upper portion of chamber 32.

In this embodiment conduit 11 extends through chamber 14 so as to establish a good heat transfer relationship between the liquid or vapor flowing through conduit 11 and the fluid in chamber 14.

OPERATION

The hot fluid from solar energy collector 5 will flow through heat exchanger 3' thereby transferring heat to liquid 2 and causing it to boil and evaporate. This evaporation will cause an increase of pressure within chamber 1 which is momentarily closed, because valve 8 is normally closed and perforation 36 is obstructed by arrangement 39 (there is no liquid within chamber 32). As a consequence of the increase of pressure within chamber 1, liquid or vapor will be caused to flow along conduit 9 through heat exchanger 10 and up conduit 11. When flowing through heat exchanger 10, heat will be extracted therefrom. The colder fluid flowing up conduit 11 and through valve 12 will also flow through condensing chamber 14 where it will either acquire or loose heat, according to the parameters of operation. The liquid flowing up conduit 11 will flow into chamber 7 and become accumulated therein. As valve 40 (which, if desired, can be controlled by a float positioned within chamber 7) is normally closed, the fluid accumulated in chamber 7 cannot ingress into chamber 32. When the liquid in chamber 7 accumulates up to level 41, siphon arrangement 44 will be activated whereby liquid is discharged from chamber 7 into chamber 32 through conduit 42. Chamber 32 discharges any vapor contained therein through conduit 38. Conduit 43 may be eliminated when the volume of liquid caused to ingress into chamber 32 is small with respect to the volume of chamber 14 because the vapor which occupies chamber 32 can flow into condensing chamber 14 through perforation 37 and conduit 34 without any substantial pressure accumulation in chamber 32 preventing ingress of liquid thereinto through siphon 44.

It is to be noted that obstructing member 39 of floating valve 38 will obstruct perforation 36 and leave free perforation 37 as long as the level of liquid within chamber 32 is insufficient to cause flotation of valve 38. When the level of liquid is sufficient to cause valve 38 to rise due to flotation thereof then obstructing member 39 will obstruct perforation 37 and leave free perforation 36.

As perforation 36 is now open, the pressure within chamber 1 is transferred to chamber 32 and to chamber 7 through conduits 42 and/or 43. The pressures in chambers 1 and 7 tend to become equal whereby the weight of liquid within chamber 7 will cause valve 8 to become opened thus permitting the colder liquid contained in chamber 7 to flow back into chamber 1 where it will be again heated as long as hot fluid is flowing through heat exchanger 3'. Upon the new transfer of heat from heat exchanger 3' to the liquid 2 in chamber 1 a new cycle will be initiated.

Chamber 32 will become emptied of liquid, when a certain falling level of liquid in chamber 7 is reached, through conduit 33 and valve 40. The level of liquid in chamber 7 at which valve 40 opens is determined by the loading of valve 40.

When chamber 32 becomes empty, floating valve 38 will fall and perforation 37 will be opened while perforation 36 will become closed by obstructing member 39.

The residual pressure caused by vapors in chambers 7 and 32 will pass to chamber 14 where the vapors will become condensed. This condensate will accumulate in chamber 7 by flowing down conduits 34 and 33.

It is to be noted that operation of float valve 38 (and therefore opening and closing of perforations 36 and 37) is not influenced by the pressures in chambers 1, 7, 32 and 14 but depends exclusively on the level of liquid in chamber 32; consequently valve 38 will only rise when the liquid reaches maximum level 41 in chamber 7, and will only fall back to its normal rest position when chamber 7 is nearly fully empty.

So as to avoid using a float valve 38 of large volume it is possible to combine a smaller volume float valve with a compensating spring 45 or counter weight.

The dimensions of perforations 36 and 37 as well as the distance therebetween and the dimensions of float valve 38 are such that while perforation 37 is open, even if only partially, perforation 36 will be closed by obstructing member 39 and opening 36 will start to become open when perforation 37 is completely obstructed. The consequence of this is that during the phase in which the pressures in chambers 1 and 7 tend to become equal by the flow of vapor from chamber 1 to chamber 7, auxiliary chamber 14 is excluded from the circuit and thus pressure is not transferred from chamber 1 to chamber 14. Consequently, a much smaller volume of vapor is needed to equalize the pressures in chambers 1 and 7. This affords the some of the advantages explained when detailed reference was made to FIG. 4.

On the other hand, if mouth 9" of conduit 9 is positioned in the upper part of chamber 1, then vapor will flow along conduit 9 into heat exchanger 10. This vapor will become condensated in heat exchanger 10 thus giving off a large amount of heat (due to its latent heat) than that given off when liquid is caused to flow through heat exchanger 10; the condensate in heat exchanger 10 will be caused to flow in much the same manner as previously described.

The advantage of the foregoing resides in the possibility of notably reducing the dimensions of the arrangement but with the disadvantage that it will be submitted to higher pressures inasmuch as the "weights" of the fluid in columns 9 and 11 are very different (conduit 11 will be full of liquid and conduit 9 will be full of vapor).

A fluid that has been found to be of good use in this embodiment is ammonia. For operating temperatures of from 50° C. to 60° C. a pressure rise of 7,2 kg/cm$^2$ is obtained. This enables the arrangement to cause liquid to flow down conduit 9 and up conduit 11 even with differences of level of 45 m with a difference between the temperature of chamber 1 and heat exchanger 10 of only 10° C. At 60° C. the ammonia reaches an absolute pressure of 28 kg/cm$^2$.

I claim:

1. A closed circuit arrangement for transferring heat from a first upper level to a second lower level by heating a liquid at the first level and causing it to flow through the second level, whereat the heat is extracted therefrom, back to the first level, the arrangement comprising a first chamber for housing an easily vaporizable liquid and defining said first upper level; a second chamber above said first chamber; means defining a communication for fluid flow from said first chamber to said second chamber and having a part thereof extending through said second lower level; means for heating and vaporizing the liquid when in said first chamber to cause the liquid or its vapor to flow through said lower level into said second chamber by effect of an increase in pressure in said first chamber; means enabling said liquid to liberate heat at said second lower level; means defining a return path for liquid from said second chamber to said first chamber; and valve means interposed in said means defining the return path and adapted to intermittently permit the return of liquid from said second chamber to said first chamber wherein said valve means are first valve means adapted to intermittently permit the return of liquid from said second chamber to said first chamber each time the vapor pressure in the first chamber and which acts on said valve means is lower than the vapor and liquid pressures acting on said valve means from the second chamber, the arrangement further comprising means defining a communication for vapor flow from said first chamber to said second chamber; and a float valve in said communication for vapor adapted to open and permit flow of vapor from said first chamber to said second chamber only after accumulation of liquid in said second chamber, whereby upon opening of said float valve vapor pressure in said first chamber and said first valve means is opened by the pressure exerted thereon by the liquid accumulated in said second chamber.

2. A closed circuit arrangement as defined in claim 1, wherein a unidirectional valve is provided in the communication from said first chamber to said second chamber to prevent the back flow of liquid along this communication, from the second chamber to the first chamber.

3. A closed circuit arrangement as defined in claim 2, wherein said unidirectional valve is spring loaded so as to cause an accumulation of pressure in said first chamber up to a certain magnitude.

4. A closed circuit arrangement for transferring heat from a first upper level to a second lower level by heating a liquid at the first level and causing it to flow through the second level, whereat the heat is extracted therefrom, back to the first level, the arrangement comprising a first chamber for housing an easily vaporizable liquid and defining said first upper level; a second chamber above said first chamber; means defining a communication for fluid flow from said first chamber to said second chamber and having a part thereof extending through said second lower level; means for heating and vaporizing the liquid when in said first chamber to cause the liquid or its vapor to flow through said lower level into said second chamber by effect of an increase in pressure in said first chamber; means enabling said liquid to liberate heat at said second lower level; means defining a return path for liquid from said second chamber to said first chamber; and valve means interposed in said means defining the return path and adapted to intermittently permit the return of liquid from said second chamber to said first chamber, the arrangement further comprising a third chamber; said valve means being first valve means adapted to intermittently permit the return of liquid from said second chamber to said first chamber each time the vapor pressure in said first chamber acting on the first valve means is lower than the vapor and liquid pressure acting on the first valve means from said second chamber; a valve arrangement comprising a valve control chamber having its lower portion in communication with said second chamber, a vapor communication between said first chamber and said control chamber; a communication between said third chamber and said control chamber, a floating valve in said control chamber for obstructing one at a time of these last two mentioned communications in response to the absence or presence of liquid in said control chamber; a siphon arrangement connecting the upper portion of said second chamber with the upper portion of said valve control chamber; said floating valve being adapted to open the vapor communication between said first chamber and said control chamber and shut off vapor communication between said third chamber and said control chamber upon accumulation of liquid in said second chamber to a level sufficient to activate discharge of liquid from said second chamber to said control chamber through said siphon arrangement, whereby vapor pressure in said second chamber becomes equal to the vapor pressure in said first chamber and said first valve means are opened by the pressure exerted thereon by the liquid accumulated in said second chamber.

5. An arrangement as defined in claims 1 or 4, wherein said means for heating the fluid is a solar energy collecting means.

* * * * *

UNITED STATES PATENT AND TRADEMARK OFFICE
CERTIFICATE OF CORRECTION

PATENT NO. : 4,241,784

DATED : December 30, 1980

INVENTOR(S) : Victorio TACCHI

It is certified that error appears in the above—identified patent and that said Letters Patent is hereby corrected as shown below:

Column 10, line 63, after "vapor pressure" insert the following:

-- in said second chamber becomes equal to the vapor pressure --.

Signed and Sealed this

Seventeenth Day of November 1981

[SEAL]

Attest:

Attesting Officer

GERALD J. MOSSINGHOFF

Commissioner of Patents and Trademarks